United States Patent
Hayashi et al.

(10) Patent No.: US 7,636,289 B2
(45) Date of Patent: Dec. 22, 2009

(54) OPTICAL-RECORDING MEDIUM, METHOD FOR PRODUCING THE SAME, AND METHOD FOR RECORDING AND REPRODUCING OPTICAL-RECORDING

(75) Inventors: Yoshitaka Hayashi, Yokohama (JP); Hiroshi Miura, Yamato (JP); Hisamitsu Kamezaki, Yokosuka (JP)

(73) Assignee: Ricoh Company, Ltd., Tokyo (JP)

(*) Notice: Subject to any disclaimer, the term of this patent is extended or adjusted under 35 U.S.C. 154(b) by 250 days.

(21) Appl. No.: 11/660,884

(22) PCT Filed: Aug. 19, 2005

(86) PCT No.: PCT/JP2005/015495

§ 371 (c)(1),
(2), (4) Date: Sep. 28, 2007

(87) PCT Pub. No.: WO2006/022360

PCT Pub. Date: Mar. 2, 2006

(65) Prior Publication Data

US 2008/0068970 A1    Mar. 20, 2008

(30) Foreign Application Priority Data

Aug. 27, 2004 (JP) .............................. 2004-249036

(51) Int. Cl.
 *G11B 3/74* (2006.01)
(52) U.S. Cl. ..................... 369/94; 369/283; 369/288
(58) Field of Classification Search ........................ None
 See application file for complete search history.

(56) References Cited

U.S. PATENT DOCUMENTS 5,089,358 A    2/1992    Taki et al.

FOREIGN PATENT DOCUMENTS

| JP | 3-37841 | 2/1991 |
|---|---|---|
| JP | 3-290842 | 12/1991 |
| JP | 8-63782 | 3/1996 |
| JP | 8-124211 | 5/1996 |
| JP | 9-35329 | 2/1997 |
| JP | 11-53763 | 2/1999 |
| JP | 11-176021 | 7/1999 |
| JP | 2000-251321 | 9/2000 |

(Continued)

*Primary Examiner*—Paul Huber
(74) *Attorney, Agent, or Firm*—Cooper & Dunham, LLP

(57) ABSTRACT

An object of the invention is to provide an optical-recording medium in which problems such as cross-write, i.e., signals are recorded wrongly on adjacent tracks, and cross-erase i.e., recording signals on adjacent tracks are erased wrongly, can be solved, and which enables high-density recording; a method for producing the optical-recording medium; and a method for recording and reproducing an optical-recording medium. To achieve this object, the optical-recording medium includes a substrate, an optical-absorption layer which absorbs light and generates heat on or above the substrate, a recording layer, and record-blocking portions which block recording on the recording layer, in which the record-blocking portions are disposed between the recording layer and the optical-absorption layer, and between adjacent tracks, and recording marks are formed on the recording layer by the optical absorption function of the optical-absorption layer.

17 Claims, 9 Drawing Sheets

FOREIGN PATENT DOCUMENTS

| | | |
|---|---|---|
| JP | 2000-276770 | 10/2000 |
| JP | 2001-236689 | 8/2001 |
| JP | 2001-266405 | 9/2001 |
| JP | 2001-344823 | 12/2001 |
| JP | 2003-217176 | 7/2003 |
| JP | 2003-228880 | 8/2003 |
| JP | 2003-228885 | 8/2003 |
| JP | 2003-263805 | 9/2003 |
| JP | 2004-158091 | 6/2004 |
| JP | 2004-213774 | 7/2004 |

OPTICAL-RECORDING MEDIUM, METHOD FOR PRODUCING THE SAME, AND METHOD FOR RECORDING AND REPRODUCING OPTICAL-RECORDING

This application is a 371 of PCT/JP05/15495, filed Aug. 19, 2005.

TECHNICAL FIELD

The present invention relates to optical-recording media which enables high-density recording without the influence on the adjacent tracks and marks such as cross-write and cross-erase under such high-density recording that cross-erase, that is, adjacent marks are erased during recording, and cross-write, that is, signals are recorded on adjacent tracks, occur. The present invention also relates to methods for producing the optical-recording media and methods for recording and reproducing optical-recording media.

BACKGROUND ART

Disc optical-recording media such as CD and DVD media are widely used among optical-recording media, and there has been an increasing demand for the higher-density and higher-capacity in such optical-recording media with advancement of information technologies, e.g. development of multimedia or network.

Downsizing the area in which a specific amount of data is recorded, in other words, reducing the size of recording mark is one method for achieving high-density. In order to reduce the size of recording marks, it is necessary to make the spot size of light smaller by narrowing the light beam. Spot size of light is proportional to the amount of $\lambda/NA$, where $\lambda$ is a wavelength of light and NA is a numerical aperture of lens. Therefore, in order to reduce the spot size of light, either making smaller wavelength of light or making larger a numeric aperture of lens is applied. Recently, the DVD technologies in which the light having a wavelength of 650 nm is applied have started to be practically utilized, and further the technologies aiming for high-density using the light having a wavelength of about 400 nm are being actively developed.

In order to realize high-density, it is necessary to increase the liner-recording density and track density by narrowing the interval between the marks while reducing the size of recording marks. When achieving high-density by making track pitches smaller, certain problem arises, i.e., crosstalk between adjacent tracks. Crosstalk is such a phenomenon that signals recorded on adjacent tracks during the reproducing. In addition, during recording or erasing the signals, other problem arises, that is, cross-write in which signals are recorded wrongly on adjacent tracks, and cross-erase in which recording marks are wrongly erased from adjacent tracks.

When using a pick-up having a wavelength of about 405 nm and a numerical aperture NA of 0.85, which is being put into practice, the spot size is 0.82×405/0.85=about 390 nm. Herein, the figure 0.82 is a constant which is generally used when the profile of light is in accordance with a Gaussian distribution. Since the spot size is in accordance with the Gaussian distribution, the constant is defined as $1/(e^2)$ value of the peak of the distribution. There is a limit in collecting light. Therefore, when achieving high-density further by narrowing track pitch, the optical-recording media are required to be improved more.

When attempting to achieve high-density by making the length of recording marks shorter, a problem arises that the displacement of recording marks affects more adversely the error rate. In other words, the displacement of recording marks becomes relatively large, causing a remarkable increase in jitter of signals.

In order to solve such problems, a method which utilizes the difference of thermal conductivity is developed. For example, Patent Literature 1 discloses a method for reducing the cross-write and cross-erase is disclosed, wherein heat conduction is prevented by disposing layers having different thermal conductivities, thereby cross-write and cross-erase are reduced. In this method, the recording is conducted by absorbing light mainly in the recording layer and generating heat.

Patent Literatures 2 to 7 disclose a method for suppressing the generation of such phenomenon as cross-write and cross-erase while the track pitch is narrow as follows. Specifically, in the method, a recording area formed on a disk substrate is divided by track, and a region of a material having a thermal conductivity smaller than that of recording material constituting the recording area is interposed. This structure makes it difficult that the temperature rise in the beam spot, caused by light beam irradiation during the recording and erasing of signals, passes to the adjacent tracks. These Patent Literatures also disclose a method for diminishing the jitter during the reproducing of signals by utilizing a structure in which the recording area is divided not only between tracks but also within a track, i.e., divided by recording mark. In this case, too, the recording is conducted by absorbing light in the recording layer and generating heat.

In the case where signals are recorded by utilizing the heat generated from the absorption of light in the recording layer, the recording layer absorbs light, the temperature rises to the degree at which the recording is possible, and then signals are recorded. Thus, narrower track pitch causes the adjacent recording area to be within the light spot even after dividing the recording layer. As a result, recording marks are formed even on the recording layer in the recording area of adjacent tracks, which makes it difficult to prevent the cross-write and cross-erase perfectly. In addition, this method requires use of photolithography and the like, which makes manufacturing process complicated and thus production cost becomes expensive. Further, there is other problem that the method using photolithography is not suitable for preparing an optical recording medium with large area.

Patent Literature 8 discloses an invention in which the thickness of a recording layer on the side wall of the groove between the groove and land is thin, thereby reducing cross-erase.

In Patent Literature 9, conductors in a line form are provided and signals are recorded on the space between the conductors. The conductor allows the heat to be dissipated well and recording may be conducted without spreading of the recording marks. Specifically, edge of laser beam is intercepted and the heat is dissipated by the conductor, thus reducing influence on the adjacent tracks.

Patent Literature 10 discloses an information-recording medium employing a method to limit the area on which the recording marks are formed. In the method, metal layers in a line form are provided periodically, thereby periodical change of thermal conductivity is allowed and the area is limited. In these Patent Literatures, cross-write and the like are prevented by providing a metal film in a line manner as a base and utilizing the difference of the heat conductivities.

Patent Literatures 11 and 12 disclose optical-recording media using light-intercepting structures. These Literatures intend to reduce cross-talk, and the effect on the prevention of the cross-write and/or cross-erase is not apparent. Particularly, Patent Literature 11 discloses an invention in which the sum of the width of the track pitch and light-intercepting film is adjusted to the spot size of laser beam. However, in the case where, for achieving further high-density, the track pitch becomes small relative to the light spot and light spot extends to adjacent tracks, a new problem arises.

Patent Literature 12 discloses an invention which suppresses the cross-talk utilizing a mask effect based on the optical phase difference or utilizing a mask effect based on the difference in the optical properties caused by the difference of crystalline phase. In this invention, too, the effect on the prevention of the cross-write and/or cross-erase is not apparent. Further, when the masks are used for optical-recording media in which heat is utilized for recording, wide marks are obtained due to the influence of heat conductance. Thus, it is difficult to prevent the spreading of the recording marks over the adjacent tracks. Besides, the recording marks are recorded even on the masked portions since mask layer itself generates heat. Therefore, the cross-write may not be suppressed effectively.

Patent Literature 13 discloses an optical-recording medium in which a projected deformed portion is provided in the boundary between adjacent recording areas and the distance for the heat to travel is made to larger, thereby reducing cross-write and cross-erase in the adjacent portions. Even if the distance for the heat to travel is made to larger, when recording density is increased, the heat may spread and influence adjacent tracks because the layers constituting the optical-recording medium are formed in a continuous manner. In addition, this optical-recording medium is restricted to groove recording alone.

Patent Literature 14 discloses an invention in which the cross-erase is prevented by deepening the depth of the groove, or when the groove is shallow, the thickness in the vicinity of the boundary between the groove and land is reduced or a film is removed.

Patent Literature 1 Japanese Patent Application Laid-Open (JP-A) No. 2004-158091

Patent Literature 2 Japanese Patent Application Laid-Open (JP-A) No. 2000-276770

Patent Literature 3 Japanese Patent Application Laid-Open (JP-A) No. 2001-236689

Patent Literature 4 Japanese Patent Application Laid-Open (JP-A) No. 2000-251321

Patent Literature 5 Japanese Patent Application Laid-Open (JP-A) No. 2003-263805

Patent Literature 6 Japanese Patent Application Laid-Open (JP-A) No. 2001-266405

Patent Literature 7 Japanese Patent Application Laid-Open (JP-A) No. 11-176021

Patent Literature 8 Japanese Patent Application Laid-Open (JP-A) No. 11-53763

Patent Literature 9 Japanese Patent Application Laid-Open (JP-A) No. 2003-228880

Patent Literature 10 Japanese Patent Application Laid-Open (JP-A) No. 2003-217176

Patent Literature 11 Japanese Patent Application Laid-Open (JP-A) No. 03-290842

Patent Literature 12 Japanese Patent Application Laid-Open (JP-A) No. 08-63782

Patent Literature 13 Japanese Patent Application Laid-Open (JP-A) No. 2003-228885

Patent Literature 14 Japanese Patent Application Laid-Open (JP-A) No. 08-124211

DISCLOSURE OF INVENTION

Accordingly, it is an object of the invention to provide an optical-recording medium in which problems such as cross-write, i.e., signals are recorded wrongly on adjacent tracks, and cross-erase i.e., recording signals on adjacent tracks are erased wrongly, can be solved, and which enables high-density recording; a method for producing the optical-recording medium; and a method for recording and reproducing an optical-recording medium.

The optical-recording medium according to the invention comprises a substrate, an optical-absorption layer which absorbs light and generates heat on or above the substrate, a recording layer, and record-blocking portions which block recording on the recording layer, wherein the record-blocking portions are disposed between the recording layer and the optical-absorption layer, and between adjacent tracks, and recording marks are formed on the recording layer by the optical absorption function of the optical-absorption layer. In this case, in one aspect, the record-blocking portions are preferably heat-insulating portions which insulate heat, in another aspect, preferably, the heat-insulating portions comprise a mixture of a material A and a material B, and the material A is a silicon compound and the material B is at least one selected from the group consisting of sulfide, selenide, and fluoride, in another aspect, the thermal conductivity of the heat-insulating portions is preferably lower than that of a material of the recording layer, in another aspect, the optical absorptivity of the heat-insulating portions at a wavelength of recording light is preferably $1 \times 10^{-3}$ to $1 \times 10^{-5}$, in another aspect, the record-blocking portions are preferably light-intercepting portions which intercept light, in another aspect, preferably, the light-intercepting portions comprise one of at least one metallic material and a mixture of a material A and a material B, the material A is a silicon compound and the material B is at least one selected from the group consisting of sulfide, selenide, and fluoride, in another aspect, the record-blocking portions are preferably spaced at specific intervals on a light source side with respect to the optical-absorption layer, in another aspect, the record-blocking portions are preferably formed in either a circular or spiral manner, in another aspect, the recording layer preferably comprises any one of a metal, a semiconductor, and a semimetal oxide, in another aspect, the recording layer preferably comprises an organic dye, in another aspect, the organic dye preferably has a maximum absorption band which does not include a wavelength of recording light, in another aspect, preferably, the optical-absorption layer is free from one of change in its properties and deformation when the optical-absorption layer absorbs light and the temperature rises, in another aspect, preferably, the optical-recording medium further comprises a super-resolution layer, wherein the super-resolution layer causes super-resolution phenomenon by one of the intensity distribution of beamed light and the thermal distribution resulting from light irradiation, in another aspect, preferably, the super-resolution layer also serves as the optical-absorption layer.

The method for producing an optical-recording medium according to the invention comprises forming a laminated body by disposing at least an optical-absorption layer and a thin film for forming convex heat-insulating portions on or above a substrate; determining a shape of the convex heat-insulating portions by irradiating the laminated body with light from the thin film side; and forming the convex heat-insulating portions by removing unnecessary part of the thin film for forming convex heat-insulating portions.

The method for recording and reproducing an optical recording medium according to the invention comprises irradiating the optical-recording medium of the invention with recording light and reproducing light to record and reproduce information, wherein the recording light has a wavelength different from that of the reproducing light. In this case, in one aspect, the recording light and the reproducing light are preferably applied through a substrate.

BEST MODE FOR CARRYING OUT THE INVENTION (Optical-Recording Medium)

An optical-recording medium according to the invention comprises a substrate, an optical-absorption layer which absorbs light and generates heat, a recording layer, and record-blocking portions which blocks the recording on the recording layer, and may comprise other layers according to necessity.

The record-blocking portions are disposed between the recording layer and the optical-absorption layer, and between adjacent tracks. The recording marks are formed on the recording layer due to the optical absorption function of the optical-absorption layer.

Generally, signals are recorded along the tracks formed in a circular manner in optical-recording media. When increasing the track density and narrowing the track pitch in order to achieve the high-density, the size of light spot becomes larger than the width of the tracks. Thus, adjacent tracks are also irradiated with the light, and the temperature of the portions irradiated with the light of the adjacent tracks rises while the recording layer absorbs and the light and the temperature rises. As a result, signals recorded on the adjacent tracks may be erased i.e. causing cross-erase, and also signals may be recorded on the adjacent tracks i.e. causing cross-write.

In contrast, in the present invention, spreading of the recording marks is suppressed by controlling the heat and light and adverse effects on the adjacent tracks is prevented, thereby reducing cross-write, cross-erase and the like. In other words, in the optical-recording medium according to the invention, the recording layer is not divided unlike the conventional methods, but is equipped with record-blocking portions, so that cross-write and cross-erase may be suppressed. The invention also provides a method for forming record-blocking portions by applying a convenient method such as light irradiation and etching unlike the methods complicating and inconvenient for preparing an optical recording medium with large area, such as lithography.

The recording principle of the optical-recording medium according to the invention will be described with reference to the drawings. However, explanation below may include assumptions because the recording principle is not fully elucidated.

Figure 1:
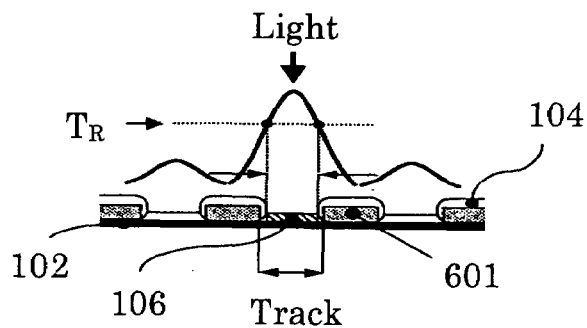
FIG. 1 is a view for illustrating an example of recording principle in the invention.
Figure 2:
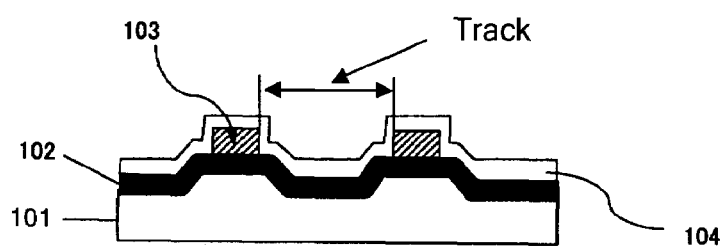
FIG. 2 is a view illustrating an example of an aspect of the "between adjacent tracks" in the invention.
Figure 3:
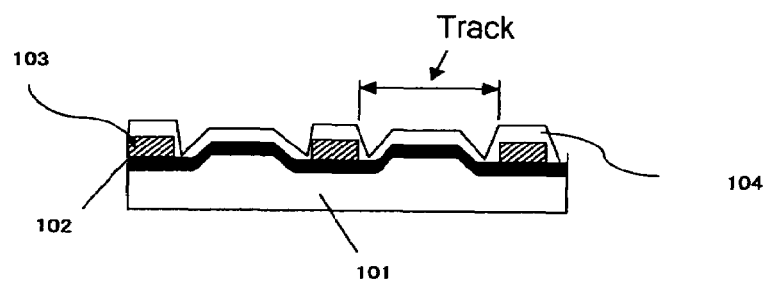
FIG. 3 is a view illustrating an example of another aspect of the "between adjacent tracks" in the invention.
Figure 4:
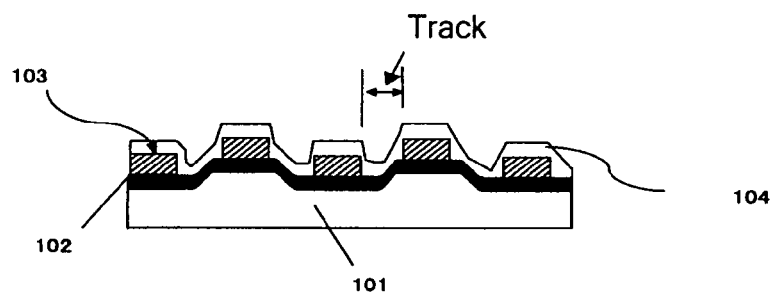
FIG. 4 is a view illustrating an example of another aspect of the "between adjacent tracks" in the invention.
Figure 5:
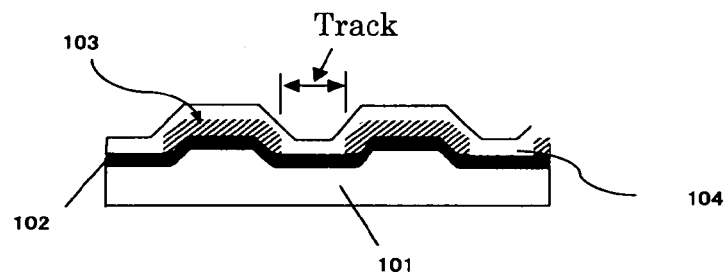
FIG. 5 is a view illustrating an example of another aspect of the "between adjacent tracks" in the invention.
Figure 6:
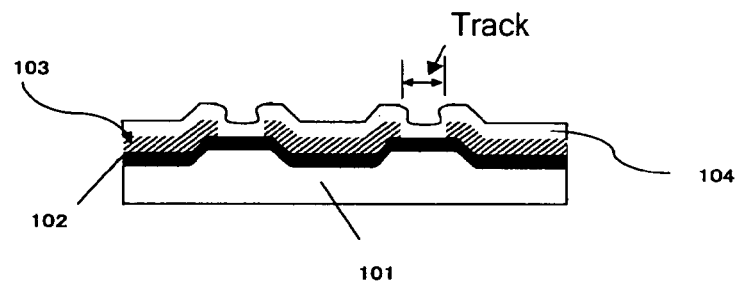
FIG. 6 is a view illustrating an example of another aspect of the "between adjacent tracks" in the invention.
Figure 24:
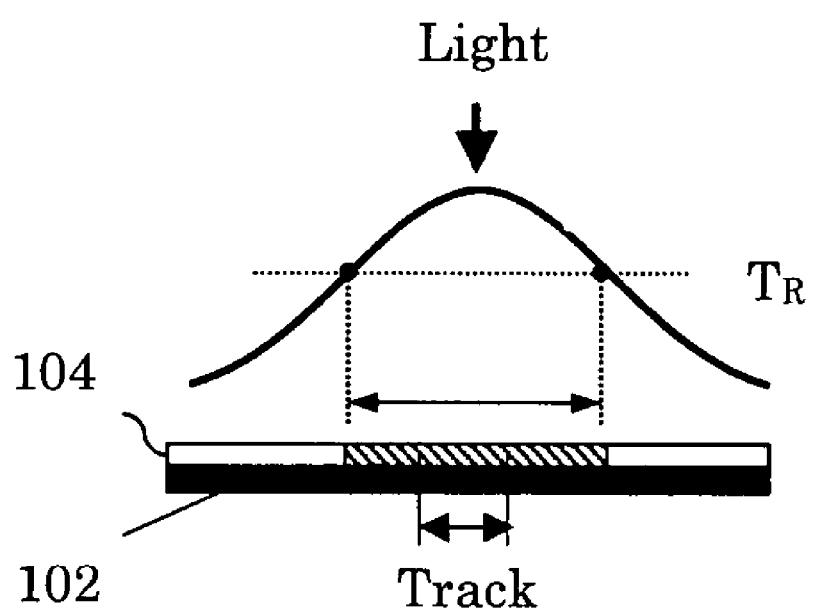
FIG. 24 is a view explaining a recorded state in the case where the recording-blocking portion is not disposed.

FIG. 1 is a schematic cross-sectional view of the optical-recording medium according to the invention. In FIG. 1, the horizontal direction shows the radial direction of the optical-recording medium, and the vertical direction shows the direction of the tracks. This is true for similar schematic cross-sectional views described later. The tracks and record-blocking portions 601 are alternately arranged on an optical-absorption layer 102, and the recording layer 104 is disposed on the surface layer. When this medium is irradiated with the recording light from the recording layer side, the temperature of the recording layer on the track to be recorded (center track in FIG. 1), and recording layer surrounding the track distributes like the temperature distribution in the graph in FIG. 1. The temperature of the center track is distinctively high, and the temperature of the neighboring record-blocking portions is very low. When the record-blocking portions 601 are not arranged, the temperature goes down gradually from the center to the surroundings thereof according to the intensity distribution of light, giving wide recording marks. FIG. 24 shows recording material temperature distribution and in the figure, a recording layer 104, optical-absorption layer 102, and recording temperature $T_R$ are shown. On the other hand, in case of the invention, the temperature of the recording layer under which the heat-insulating portions are formed may not rise because, even when the optical-absorption layer 102 absorbs the light and the temperature thereof goes beyond the recording temperature $T_R$, the heat is not conveyed to the recording layer 104 due to insulation effect. Alternatively, the temperature may not rise because the recording light does not reach the optical-absorption layer. Therefore, when the recording temperature $T_R$ is adjusted to the dotted line in FIG. 1 under the temperature distribution condition, cross-write may be prevented even with minor mistracking because recording marks 106 are precisely formed on the center track portion alone compared to the case without the record-blocking portions. Cross-erase may be also prevented based on the same principle.

In the optical-recording medium according to the invention, the recording layer and optical-absorption layer generating heat are disposed, so that the optical-absorption layer generates heat necessary for the recording. In addition, the record-blocking portions are formed between the two layers, the recording layer and optical-absorption layer. Therefore, even if the recording layer is a continuous film, it is possible to prevent the heat generated in the optical-absorption layer which is necessary for the recording from spreading onto the recording layer under which record-blocking portions are disposed. Further, the optical-absorption layer is formed in a continuous film, thereby the heat is allowed to escape in the in-plane direction of the film and heat spreading to the recording layer can be reduced. Utilizing the structure, cross-write and cross-erase may be suppressed sufficiently. It is required that reproducible recording marks not be substantially formed based only on the light-absorbing capacity of recording layer. For example, when Bi oxide is used for the recording layer and Ge for the optical-absorption layer, the attenuation coefficient k value indicating the absorbing capacity, results in the values shown in Table 1. The Ge film has a k value of 2.20 at the wavelength of 400 nm, and the Bi oxide film has a k value of $3.41 \times 10^{-3}$ at the same wavelength. Under such condition of absorption, only the light-absorbing capacity of Bi oxide, which is a recording layer material, may not be enough for conducting the recording.

This is true for the case when a dye is used for the recording layer. For example, when using a phthalocyanine dye having an absorbance of about 0.043 at the wavelength of 500 nm, Ge film as an optical-absorption material has an absorbance of about 0.35. Under such condition, only the capacity of the recording layer material may not be enough for conducting the recording.

TABLE 1

| | Wavelength (nm) | | |
|---|---|---|---|
| | 400 | 650 | 780 |
| Ge | 2.20 | 0.61 | 0.50 |
| Bi oxide | $3.41 \times 10^{-3}$ | 0 | 0 |

The record-blocking portion may be selected according to the purpose without limitation. Recording may be blocked, for example, by the heat-insulating portions which block recording by preventing heat conduction due to heat insulation, or may be blocked by the light-intercepting portions which block recording by suppressing the generation of heat in the optical-absorption layer due to prevention of optical-absorption by intercepting light.

As for optical-recording media having tracks, there are various systems such as a groove recording, land recording, and groove-land recording, and therefore, as for the "between adjacent tracks" in the invention, those shown in FIG. 2 through FIG. 6 are exemplified. In the figures, a substrate 101, a laminated optical-absorption layer 102, heat-insulating portions 103, and a recording layer 104 are shown. In the figures, the record-blocking portions are used as heat-insulating portions, and the record-blocking portions may be replaced with the light-intercepting portions.

Even if the width of the track is from about one-fourth to about one-fifth the size of light spot, the recording may be conducted so that the recording marks are formed within the width of the track. For example, in the case where the size of light spot is about 1.2 µm, the recording marks may be formed within the width of the track even if the track pitch is about 300 nm to 400 nm and the track is narrow such that the width of track is about 110 nm. The width of the record-blocking portion between the tracks is about 250 nm to about 300 nm. The recording marks are formed most efficiently when the track pitch is 370 nm, the width of tracks is 240 nm and the size of record-blocking portion is 130 nm.

The proper size of track pitch, width of tracks and record-blocking portion vary depending on the size of light spot.

The materials for the optical-absorption layer may be selected according to purpose, as far as the materials have a function of absorbing light and generating heat. Examples of the materials for the optical-absorption layer include semiconductors such as Si, Ge, GaAs; a metal or intermetallic compound such as Bi, Ga, In, Sn, BiTe, BiIn, GaSb, GaP, InP, InSb, InTe, SnSb; carbides such as C, SiC; oxides such as $V_2O_5$, $Cr_2O_3$, $Mn_3O_4$, $Fe_2O_3$, $CO_3O_4$, CuO; binary phase change materials such as SbTe; ternary phase change materials such as GeSbTe, InSbTe, BiSbTe, GaSbTe; quaternary phase change materials such as AgInSbTe. As mentioned above, it is required that the heat necessary for the recording be generated in the optical-absorption layer and the substantially reproducible recording marks not be formed based only on the light-absorbing capacity of recording layer. Therefore, the materials are selected such that the light-absorbing capacity of the optical-absorption layer is higher than that of the recording layer.

The thickness of the optical-absorption layer is preferably 3 nm to 20 nm. In the optical-absorption layer formed as a thin film, heat spreading inside the layer may be suppressed, and thus such optical-absorption layer is suitable for high-density recording.

As the material for the recording layer, materials of which refractive index properties change as a result of change in properties due to the heat and/or which deform due to the heat, and which give a large degree of modulation are preferred. As mentioned above, the materials having a small light-absorbing capacity are preferable so that the substantially reproducible recording marks are not formed based only on the light-absorbing capacity of the recording layer. Therefore, oxides such as a Te oxide and Bi oxide, which are the oxides of low melting point metals such as Te and Bi and have been used for write-once or rewritable optical-recording media, can be used. An organic dye which may control the optical-absorption wavelength relatively easily, can also be used.

Figure 7:
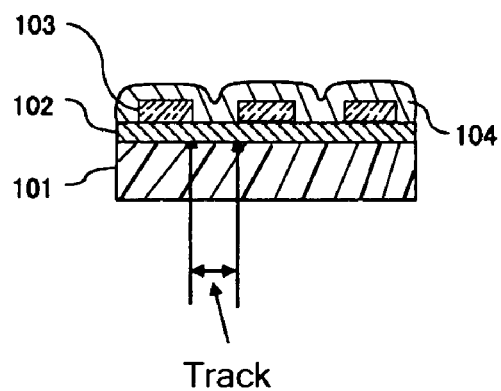
FIG. 7 is a cross-sectional view illustrating an example of the optical-recording medium comprising the heat-insulating portions according to the invention.

The record-blocking portions are preferably heat-insulating portions which insulate heat. FIG. 7 illustrates an example of the optical-recording medium according to the invention, comprising the heat-insulating portions. In the figure, a substrate 101, 101, a layer-shaped optical-absorption layer 102, heat-insulating portions 103, and a recording layer 104 are shown.

Figure 8:
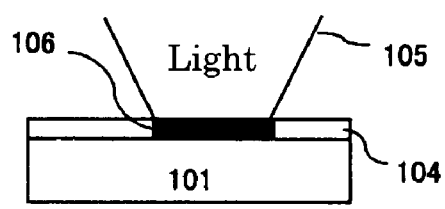
FIGS. 8 and 9 are explanatory views of recording in conventional optical-recording media.
Figure 9:
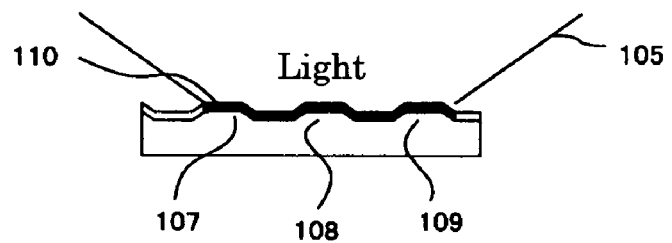

As shown in FIG. 8, generally, in the usual optical-recording medium, upon irradiation with gathered light 105 (light path is schematically illustrated), the recording layer 104 absorbs the light and the temperature rises, and thereby the recording mark 106 is formed on the portion of which temperature rose. FIG. 8 is a schematic illustration in which tracks are omitted. Since the diameter of the spot to gather light is determined by the wavelength of the light and the numerical aperture NA of the lens, the signals need to be recorded on the tracks which are smaller than the size of light spot in order to improve the recording-density. For example, as shown in FIG. 9, a recording mark 110 is formed over the three tracks when the gathered light 105 illuminates over the tracks 107 through 109. If the recording mark 110 may be recorded on only one track, the recording-density may triple in the direction of track width.

Figure 10:
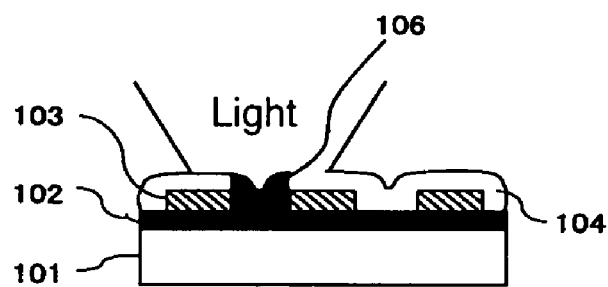
FIG. 10 is an explanatory view of an example of recording in the optical-recording medium according to the invention.
Figure 11:
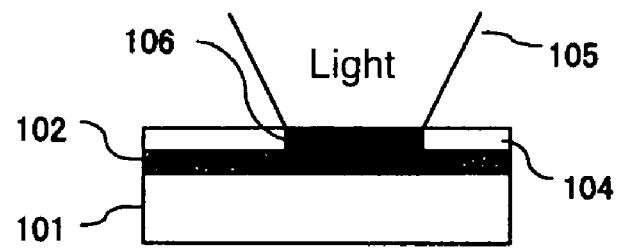
FIG. 11 is an explanatory view of recording in conventional optical-recording media.

In FIG. 10, an example of the optical-recording medium irradiated with light is illustrated. It is most preferable that the light be hardly absorbed in the recording layer 104, the light be absorbed in the optical-absorption layer 102, and the signals be recorded with the heat. Thus, here, explanation will be given using an example in which the material which hardly absorbs light is employed. Most of the light penetrates the recording layer, the light is absorbed in the optical-absorption layer to raise the temperature. The recoded marks are formed by the change in properties of or deformation of the recording layer caused by the heat of the temperature rise in the recording layer. In contrast, at the portion of the recording layer under which the heat-insulating portions 103 are formed, the heat does not travel well due to the heat-insulating portions 103. Therefore, the temperature rise of the recording layer in the portion is low. Accordingly, the recording mark 106 is formed so that it is sandwiched between the heat-insulating layers and the mark does not affect the adjacent tracks. When the light-absorbing capacity of recording layer is large, the heat generated from the absorption of light on the recording layer is spread to the adjacent tracks more easily. The spread of the heat may be suppressed by disposing heat-insulating portions under the recording layer. But the effect of suppressing the spread of recording marks is larger when the light-absorbing capacity of recording layer is smaller than that of the optical-absorption layer. As shown in FIG. 11, without heat-insulating portions, the temperature of the entire region of the recording layer 104 over the portion in which the temperature rises may rise and larger recording marks 106 may be formed.

In this way, the invention enables signals to be recorded on a narrow area, and thus cross-write and cross-erase may be reduced. Usually, the heat-insulating portions 103 are continuously formed between the tracks along the tracks. Efficient recording may be conducted by tracking between the heat-insulating portions. Tracking may be conducted between the convex heat-insulating portions formed by applying conventionally used push-pull method, DPP (Differential Push Pull) method utilizing 3 beams, and the like.

Figure 12:
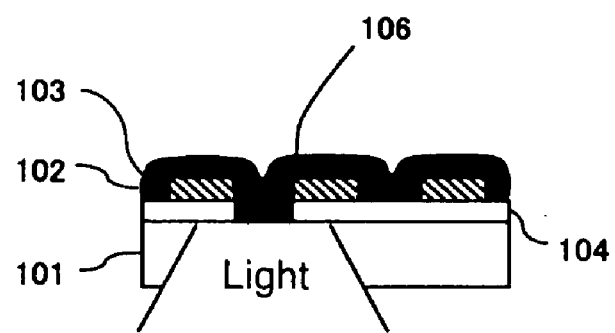
FIG. 12 is an explanatory view of an example of recording in the optical-recording medium according to the invention in which light is applied from different direction.

The same result as described above may be also obtained in the case where an optical-recording medium comprises a substrate 101, a recording layer 104, heat-insulating portions 103, and an optical-absorption layer 102 in this order as shown in FIG. 12, this optical-recording medium is irradiated with light from the substrate side. In this case, the recording marks are formed between the consecutively formed heat-insulating portions along the tracks without influence on the adjacent tracks.

The materials for the heat-insulating portion may be selected according to purpose, as far as the materials have a heat-insulating effect. Examples of the materials include oxides such as $SiO_2$, ZnO, and MgO; nitrides such as SiN, AlN, and SiON; sulfides such as ZnS, CaS, and BaS; selenides such as ZnSe and BaSe; fluorides such as MgF, $CaF_2$, and $BaF_2$. Preferably, the materials for the heat-insulating portion comprises a mixture of a material A and material B, wherein the material A is a silicon compound and the material B is at least one selected from the group consisting of sulfide, selenide, and fluoride.

Examples of the silicon compound for the material A include $SiO_2$ and SiON.

Examples of the sulfide for the material B include ZnS, CaS, and BaS. Examples of the selenide for the material B include ZnSe and BaSe. Examples of the fluoride for the material B include $CaF_2$ and $BaF_2$. These examples for the material A and B may be used individually or in combination.

As for the mixing ratio of the materials A and B, the material A is preferably 10% by mol to 30% by mol, and the material B is preferably 70% by mol to 90% by mol. Further, preferably, there is no chemical bonds between the materials A and B, and the two materials exist independently. These materials have low heat conductivity and have high insulation effect. Therefore, the materials are capable of shutting off heat well, making transmission of heat to the recording layer small, and thus preventing the portion of the recording layer under which the heat-insulating portions are formed to have changed properties or to deform. In other words, since the signals may be recorded on a narrow area and the cross-write and cross-erase may be reduced.

The thermal conductivity of the heat-insulating portions is preferably lower than that of the recording layer. When the heat-insulating portions have a higher thermal conductivity, the heat-insulating portions are soon warmed, then the heat spreads to the recording layer, and the heat-insulating portions lose the effect. On the other hand, when the heat-insulating portions have a lower thermal conductivity and the difference of the heat conductivities between the recording layer and heat-insulating portion is large, the cross-write, cross-erase and the like may be suppressed more efficiently, wherein the difference of the heat conductivities between the recording layer and heat-insulating portion is preferably a hundredfold or more on the measurement condition, for example, using light-alternating method. The thermal conductivity of the heat-insulating portions formed by the thin film composed of ZnS—$SiO_2$ used in the examples in the invention is equal to or lower than the measurable level or 0.03 W/m·K, and the thermal conductivity of the recording layer composed of Bi oxide is 2.8 W/m·K.

The heat-insulating portions are preferably composed of materials having excellent translucency properties at the wavelength of the light used for the recording (recording light). It is preferable that the temperature rise be as small as possible in the heat-insulating portions from the viewpoint of the function of the heat-insulating portions that allows the recording marks to be formed on the targeted narrow area without spreading the heat generated in the optical-absorption layer to the recording layer. The spread of the recording marks may be suppressed by using the materials having excellent translucency at the wavelength of the recorded light to suppress the absorption of light as small as possible and the temperature rises in the heat-insulating portions. Thus, the effect of suppressing the cross-write, cross-erase and the like may be improved. If possible, transparent materials which don't absorb light at all are ideal for the heat-insulating portions. When the heat-insulating portions are transparent, the heat-insulating portions do not absorb light, and thus the temperature does not rise. Then, the temperature rises due to only the heat which spreads from the optical-absorption layer. When light is absorbed in the heat-insulating portions and the temperature rises, the recording marks may be formed on the recording layers on the surface of the heat-insulating portions and this adversely affects the adjacent tracks.

However, practically, the optical absorptivity of the materials for use in the heat-insulating portions is preferably $1 \times 10^{-3}$ to $1 \times 10^{-5}$. Examples of the materials having an optical absorptivity of $1 \times 10^{-3}$ to $1 \times 10^{-5}$ include silicon compounds such as $SiO_2$, SiON, and SiN; sulfides such as ZnS, CaS, and BaS; selenides such as ZnSe and BaSe; fluorides such as $CaF_2$ and $BaF_2$; and the like. Also, a mixture in which two or more materials with translucency are mixed may be used. For example, a mixture of the material A and the material B having an optical absorptivity of $1 \times 10^{-3}$ to $1 \times 10^{-5}$ is exemplified.

The record-blocking portion are preferably light-intercepting portions which intercept light. As the material for the light-intercepting portions, a wide range of materials having a function of which block off the light can be used. Here, "light intercepting" means not only the case where light does not penetrate by giving such structure but also the case where the same effect as "light intercepting" is achieved by giving such structure that light is not fully absorbed in the optical-absorption layer. In the former case, light is intercepted for example, using a metal such as Ag, Al, and Cu. In the latter case, for example, transparent materials including oxides such as $SiO_2$, ZnO, and MgO; nitrides such as SiN, AlN, and SiON; fluorides such as MgF are used, and the optical properties and thickness of the transparent materials is optimized, so that more light is reflected on the surface of the optical-absorption layer.

Examples of the latter include optimizing the optical properties and thickness of the transparent materials such as an oxide such as $SiO_2$, ZnO, and MgO; a nitride such as SiN, AlN, and SiON; a fluoride such as MgF in order to increase the amount of light reflected on the surface of the optical-absorption layer.

As the transparent material, materials including a mixture of materials A and B, wherein the material A is a silicon compound and the material B is at least one selected from the group consisting of sulfide, selenide and fluoride, are preferred. Examples of the silicon compound for material A include $SiO_2$, SiN and SiON. Examples of the sulfide for the material B include ZnS, CaS, and BaS. Examples of the selenide include ZnSe and BaSe. Examples of the fluoride include $CaF_2$ and $BaF_2$.

Figure 13:
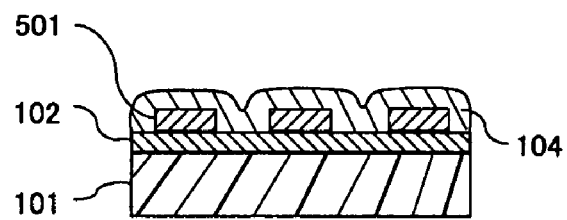
FIG. 13 is a cross-sectional view illustrating an example of the optical-recording medium having the light-intercepting portions according to the invention.

FIG. 13 illustrates an example of the optical-recording medium comprising light-intercepting portions according to the invention. In the figure, a substrate 101, a composite optical-absorption layer 102, heat-insulating portions 501, and a recording layer 104 are shown.

Figure 14:
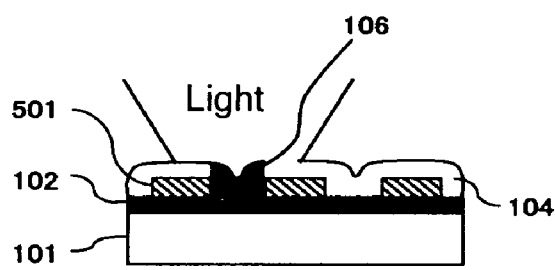
FIG. 14 is an explanatory view of an example of recording in the optical-recording medium according to the invention.

In FIG. 14, an example of the optical-recording medium irradiated with light is illustrated. It is most preferable that the light be hardly absorbed in the recording layer 104, the light be absorbed in the optical-absorption layer 102, and the signals be recorded with the heat. Thus, here, explanation will be given using an example in which the material which hardly absorbs light is employed. Most of the light penetrates the recording layer, the light is absorbed in the optical-absorption layer, and then the temperature rises. The recoded marks are formed by the change in properties of or deformation of the recording layer caused by the heat of the temperature rise in the recording layer. In contrast, at the portion of the optical-absorption layer on which the light-intercepting portions 501 are formed, the light is blocked off or is reflected, and thus does not reach the optical-absorption layer. As a result, the optical-absorption layer underlying the light-shielding portion does not generate the heat, and thus the recording layer corresponding to the portion does not change. Thus, the recording mark 106 is formed between the heat-insulating layers and the mark does not affect the adjacent tracks. When the light-absorbing capacity of recording layer is large, the heat generated from the absorption of light in the recording layer spreads to the adjacent tracks more easily. Even when a light-shielding portion is disposed under the recording layer, the recording marks may be formed only by the light-absorbing capacity of the recording layer. Therefore, the light-absorbing capacity of the recording layer is preferably smaller than those of the optical-absorption layer. As shown in FIG. 11, without the light-shielding portion, the temperature of the entire recording layer over the portion of which temperature rises may rise and a larger recording mark may be formed.

In this way, the invention enables signals to be recorded on a narrow area, and thus cross-write and cross-erase may be reduced. Usually, the light-shielding portion 501 is continuously formed between the tracks along the tracks. Efficient recording may be conducted by tracking between the heat-insulating portions. Tracking may be conducted between the convex heat-insulating portions formed by applying conventionally used push-pull method, DPP (Differential Push Pull) method utilizing 3 beams, and the like.

The recording layer preferably comprises one of a metal oxide, semiconductor oxide, and semimetal oxide. As for the metal, various metals can be employed without limitation. Examples of the semiconductor include Si, Ge, and B. Examples of the semimetal include As, Sb, Bi, Se, Te, Sn. The use of the oxides of these elements in the recording layer achieves an optical-recording medium which enables high-density recording.

In this case, oxides of Te, Se, In, Ni, Sb, or the like are used as recording materials for write-once or rewritable optical-recording media. Here, taken up the case of the Bi oxide, explanation will be given.

In the layer structure shown in FIG. 7, the Bi oxide is used for a recording layer 104. Since the optical absorption of the Bi oxide is relatively small, the temperature rise is relatively low, such extent that the recording marks are not formed. The absorbed light in the optical-absorption layer 102 raises the temperature, and the recording marks are formed by the heat spreading to the recording layer. In contrast, in the area of the recording layer under which the heat-insulating portions 103 are formed, the heat does not spread and the recording marks are not formed. In this way, the recording marks may be formed on a narrow area so that it does not spread in the direction of track width, and the cross-write and cross-erase between adjacent tracks may be reduced.

Further, the recording layer preferably comprises an organic dye. As for the organic dye, precise wavelength controlling, as employed in conventional recordable-optical-recording media, is not required. The radiated light is absorbed in the optical-absorption layer to generate heat, the heat spreads to the recording layer, the organic dye is decomposed, thereby the recording marks are formed. Types of the organic dye are not particularly limited, as long as the thermal decomposition properties are proper. Dye materials have a feature, for example, that allows the absorption wavelength to be changed by changing the ligand thereof, and various dye materials may be used.

Examples of the organic dye include polymethine dyes, anthraquinone dyes, dioxazine dyes, triphenodithiazine dyes, phenanthrene dyes, cyanine dyes, dicarbocyanine dyes, phthalocyanine dyes, naphthalocyanine dyes, merocyanine dyes, pyrylium dyes, porphyrin dyes, xanthene dyes, triphenylmethane dyes, azulene dyes, metal-containing azo dyestuff, azo dyestuff, azo dyes, squarylium dyes, polyene dyes, base styryl dyes, formazan chelate dyes, croconium dyes, indigoid dyes, methine dyes, sulfide dyes, methanedithiolate dyes. Among these, cyanine derivatives, dicarbocyanine derivatives, phthalocyanine derivatives, naphthalocyanine derivatives, azo dye stuff derivatives are preferably used. Also, dye materials to which various quencher such as aminium dyes are added may be used.

Figure 15:
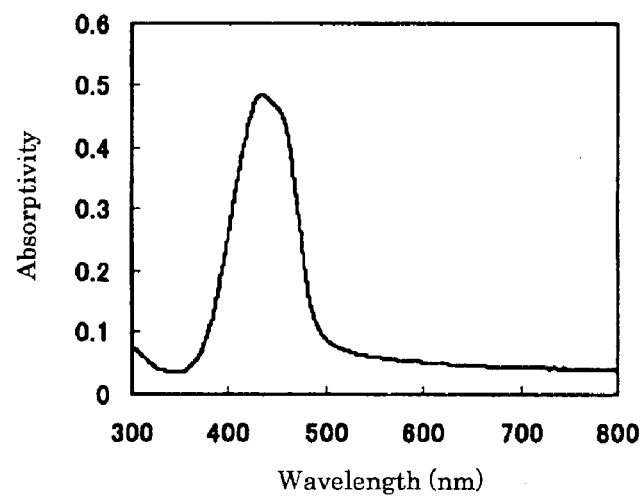
FIG. 15 is a view illustrating schematically illustrates an absorption spectrum of a dye material.

It is preferable that the dye is selected depending on the wavelength of the recording light. For example, a cyanine dye represented by the following Formula (A) may be used for the light having a wavelength of 780 nm. As shown in FIG. 15, this cyanine dye has a large absorption at around 430 nm and the absorption is not large at the wavelength of around 780 nm. The use of such dye for the recording layer is very effective.

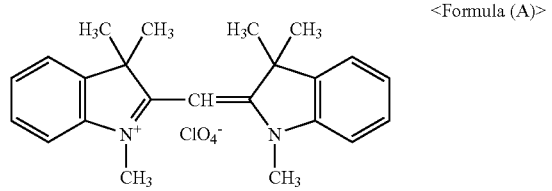
<Formula (A)>

The dye represented by the following Formula (B) may be preferably used for the light having a wavelength of about 400 nm. The dye has a small absorption at around 400 nm.

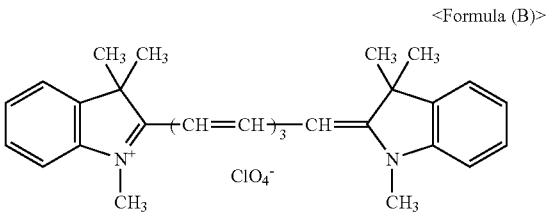
<Formula (B)>

Of the phthalocyanine dyes represented by the following Formula (C), those of which "M" is "VO" have a maximum absorption at the wavelengths of around 350 nm and 700 nm, and have a small absorption in the range of wavelengths from 450 nm to 550 nm. Thus, when light having a wavelength of 450 nm to 550 nm is used, the use of this dye in the recording layer is very effective.

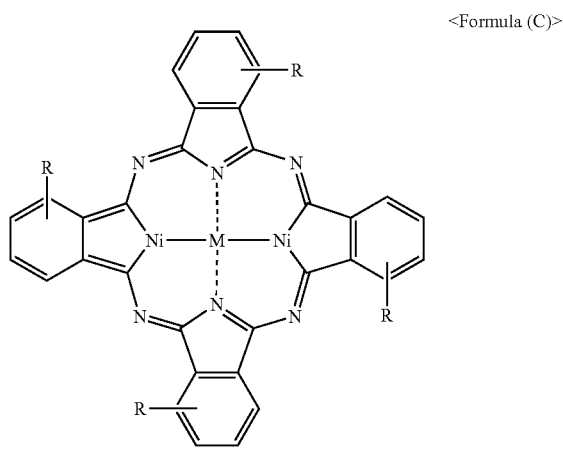
<Formula (C)>

In the Formula (C), "M" is a central metal of the phthalocyanine dye and represents any one of Cu, VO, Ni, H, Zn, Pd, Cd, Co, and Fe. "R"s independently represent a hydrogen atom, a halogen atom, a nitro group, a cyano group, a hydroxy group, a carboxyl group, a substituted or unsubstituted alkyl group, a substituted or unsubstituted alkoxy group, a substituted or unsubstituted aryl group, a substituted or unsubstituted amino group, or a substituted or unsubstituted acyl group.

Figure 16:
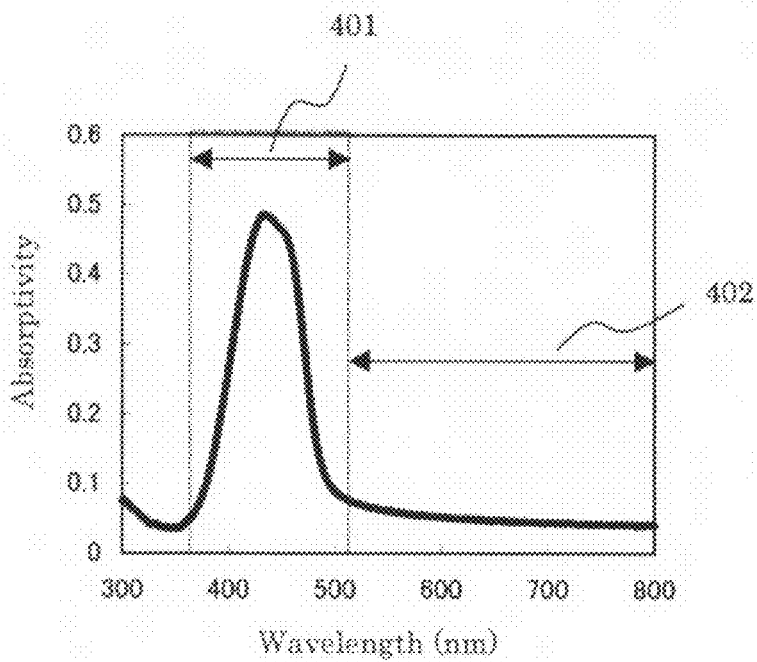
FIG. 16 is an explanatory view of a general absorption spectrum of an organic dye in a certain region of wavelength.

Preferably, the organic dye has a maximum absorption band which does not include any wavelengths of the recording light. As shown in FIG. 16, the absorption spectrum of the organic dye usually has a large absorption band or maximum absorption band 401 at around a specific wavelength. In the invention, since it is preferable that the organic dye has small absorption of the recording light, such organic dyes are selected and used that are designed to allow the wavelength of the recording light to be in an absorption band 402 where absorption is small and which is out of the maximum absorption band of the organic dye.

The maximum absorption band of the organic dye is adjustable depending on the types of ligands or substituted groups. Taken up cyanine dyes, although the structures represented by the Formula (A) and (B) are similar, the maximum absorption wavelength of the dye represented by the Formula (A) is 433 nm and that of the dye represented by the Formula (B) is 739 nm. Thus, the dye represented by the Formula (A) may be used when the wavelength of the recording light is 780 nm, on the other hand, the dye represented by the Formula (B) may be used when the wavelength of the recording light is 405 nm. The other dyes such as phthalocyanine and porphyrin dyes may be used in the same way.

The record-blocking portions are preferably spaced at specific intervals on the light source side with respect to the optical-absorption layer. In case of a optical-recording medium having a structure shown in FIG. 7 or FIG. 13, the light source is placed above in the figure and the light is applied from above. The optical-absorption layer 102 is formed on the substrate 101, and then the record-blocking portions are formed in a convex manner on the upper surface of the optical-absorption layer. In FIG. 7, the record-blocking portions serve as heat-insulating portions 103, and in FIG. 13, light-intercepting portion 501. A recording layer 104 is further formed thereon.

The record-blocking portions are preferably formed in either a circular or spiral manner.

Figure 17:
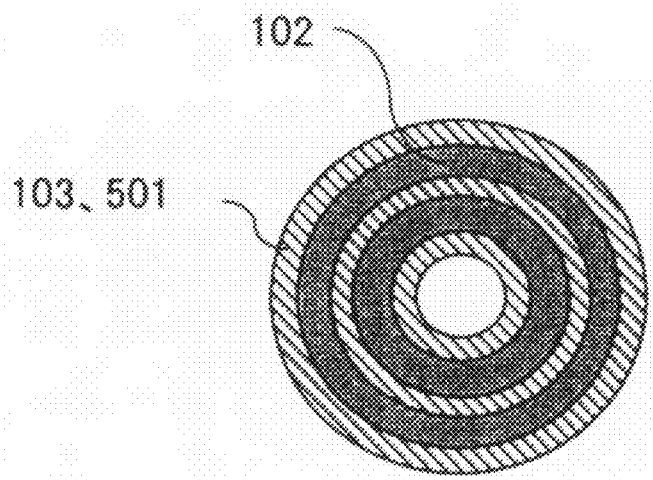
FIG. 17 is a schematic top view illustrating an example of the optical-recording medium having the record-blocking portions according to the invention.

In FIG. 17, the schematic view of an optical-recording medium from above is illustrated. In the figure, the heat-insulating portions 103 or the light-intercepting portions 501 as the record-blocking portions are formed on the upper surface of the optical-absorption layer 102 in a circular manner. The figure schematically shows a few cycles of circular heat-insulating portions or light-intercepting portions but the real optical-recording medium has such structure from inner circumference to outer circumference. The recording layer is not shown in this figure, but the recording layer is formed on the structure. Further, tracking may be conducted using this structure, and a substrate without grooves for the tracking may also be used. Since signals are recorded between the record-blocking portions, the tracking needs to be conducted there. But when the record-blocking portions are convex and the recording portions are grooved, the tracking may be conducted between the record-blocking portions formed in a convex manner by applying a push-pull method or DPP method used in a conventional optical-recording medium.

Preferably, the optical-absorption layer is free from change in its properties or deformation when the optical-absorption layer absorbs light and the temperature thereof rises. This allows to form the recording mark, controlled sufficiently. When the optical-absorption layer has a portion of which properties are changed or a deformed portion, phase difference, change in the degree of reflection, or the like of the reproducing light is caused at the portion, making it difficult to reproduce because of the overlap with the signals detected from the recording marks. In case of materials which undergo phase change easily such as SbTe, the optical-absorption layer change its phase over a wide range irradiated with light due to phase change during the recording. As a result, signals from the phase change are also detected, thus certain ingenuity is needed during reproducing. It is preferable that the optical-absorption layer is composed of a material or have a composition, which does not allow the optical-absorption layer itself to be free from change in its properties or deformation. However, since phase change materials have an excellent properties other than the property that they themselves undergo phase change, they can be used if such conduction can be selected that phase change is not caused.

Examples of the material include semiconductors such as Ge, Si, and B; metals such as Ti, Ta, and W; carbides such as C and SiC; oxides such as $V_2O_5$, $Cr_2O_3$, $Mn_3O_4$, $Fe_2O_3$, $Co_3O_4$, CuO. These materials have a high melting point and don't undergo phase change easily, thus the materials themselves does not change easily. Therefore, excellent reproduced signals may be obtained in an optical-recording medium with high-density recording.

Figure 18:
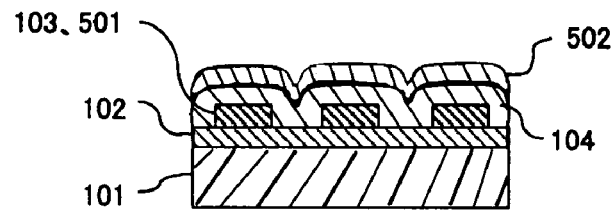
FIG. 18 is a cross-sectional view illustrating an example of the optical-recording medium having the super-resolution layer according to the invention.

Further, a super-resolution layer is preferably disposed, which causes super-resolution phenomenon by the intensity distribution of applied light, or thermal distribution resulting from light irradiation. For example, as shown in FIG. 18, the super-resolution layer 502 may be disposed on the recording layer 104. The materials for use in the super-resolution layer may be those which make it possible that when irradiated with light, the optical properties change in a part of the light spot according to the light intensity distribution in the light spot or thermal distribution resulting from light irradiation. The part in which optical properties have changed or the part in which optical properties have not changed serves as a mask, thereby achieving the state that light spot nominally becomes smaller. Examples of the materials for use in the super-resolution layer include phase change materials such as AgInSbTe, GeSbTe, SbTe, BiGe and InSb; composite oxides of an oxide such as $CO_3O_4$, $V_2O_5$, and CuO, and $SiO_2$; photochromic materials including organic dyes; and thermochromic materials. In case of the optical-recording medium in which a magnetic material is employed and polarization properties thereof are utilized, use of a magnetic material in the super-resolution layer also leads to a large effect.

The super-resolution layer is effective in both cases; the layer is formed on the light source side with respect to the recording layer, or on the opposite side to the light source, but forming of the super resolution layer on the light source side brings a larger effect. The spreading of the recording marks in the track width direction is suppressed by the structure of the record-blocking portions or the like, and the length of the recording marks along the tracks is determined by the width of the pulse of recording light. As the length of the recording marks becomes small, plural recording marks come to exist within the spot of the reproducing light, i.e. resulting in the length smaller than the resolution limit of the reproducing light. However, the use of the super resolution enables satisfactory reproduction even if the recording marks are such small. Therefore, both high track density and high linear density may be achieved, and a high-density optical-recording medium may be obtained.

Preferably, the super-resolution layer also serves as the optical-absorption layer. When the optical-absorption layer having a super-resolution function is irradiated with the light during the reproducing, the temperature rises by absorbing the light and the optical properties of a part in the light spot change. For example, when the transmission of light increases in the part which has changed optical properties, the same effect is obtained as that of the case where the light spot becomes smaller nominally. Thus, the smaller recording marks may be reproduced. The optical-absorption layer may be provided with a super-resolution function by using the layer structures shown in FIG. 7 and the like. Examples of the materials having both function of absorbing light and generating heat, and super-resolution include semiconductors such as Si, Ge, and GaAs; metals such as Bi, In, and Sn; intermetallic compounds such as BiTe, BiIn, GaSb, GaP, InP, InSb, InTe, and SnSn; carbides such as C and SiC; oxides such as $V_2O_5$, $Cr_2O_3$, $Mn_3O_4$, $Fe_2O_3$, $CO_3O_4$, CuO; binary phase change materials such as SbTe; ternary phase change materials such as GeSbTe, InSbTe, BiSbTe, and GaSbTe; quaternary phase change materials such as AgInSbTe.

The thickness of the super-resolution layer is preferably 3 nm to 20 nm. In the super resolution layer formed as a thin film, heat diffusion inside the layer may be suppressed, and thus such super resolution layer is suitable for high-density recording. The spreading of the width of the recording marks is suppressed with the structure such as the record-blocking portions, the length of the recording marks is made to be shorter by the width of a recording pulse, and then the reproducing is conducted by the super resolution. In this way, the optical-recording medium has a simple structure; however, high-density recording is achieved.

(Recording and Reproducing Method for Optical-Recording Medium)

The recording and reproducing method for an optical-recording medium according to the invention is a recording and reproducing method for an optical-recording medium in which the optical-recording medium of the invention is irradiated with recording light and reproducing light to record and reproduce information, and the recording light has a wavelength different from that of the reproducing light.

In the case of the optical-recording medium of the invention, as for recording light, the use of light having a short wavelength, allowing smaller size of light spot, is preferred. However, in the case where the absorption in the recording layer at the wavelength of the light is large, recording marks may not be formed so as to be on narrow tracks even if the optical-recording medium according to the invention is used. Therefore, in that case, it is preferable that the recording is conducted using a light having a wavelength at which the absorption in the recording layer is small. Thus, by employing the recording and reproducing method in which the recording light has a wavelength different from that of the reproducing light, the recording marks may be formed on narrow tracks and the satisfactory reproducing may be conducted.

Preferably, the recording light and the reproducing light are applied through a substrate. Same effect may be obtained even in the case where the optical-recording medium comprising a substrate 101, an optical-absorption layer 102, heat-insulating portions 103, and a recording layer 104, is irradiated with light from the substrate side and the recording is conducted (FIG. 12). Light irradiation from the substrate side makes it relatively easier to realize the compatibility with CD and DVD media.

(Method for Producing Optical-Recording Medium)

The method for producing an optical-recording medium according to the invention comprises a step of forming a laminated body by disposing at least an optical-absorption layer and a thin film for forming convex heat-insulating portions on or above a substrate, a step of determining a shape of the convex heat-insulating portions by irradiating the laminated body with light from the thin film side, and a step of forming the convex heat-insulating portions by removing unnecessary part of the thin film for forming convex heat-insulating portions, and may further comprise other steps according to necessary.

Herein, an example of the production methods for optical-recording medium is described with reference to FIGS. 19A to 19D.

Figure 19A:
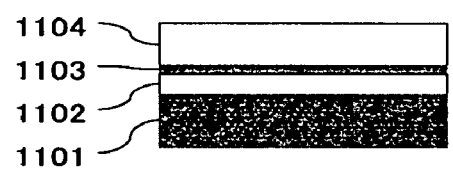
FIG. 19A is an explanatory view illustrating a step of disposing layers in an example of the method for producing an optical-recording medium according to the invention.

FIG. 19A illustrates a step of disposing layers, and in the figure, a substrate 1101, buffer layer 1102, optical-absorption layer 1103, thin film 1104 for forming convex heat-insulating portions are shown.

Figure 19B:
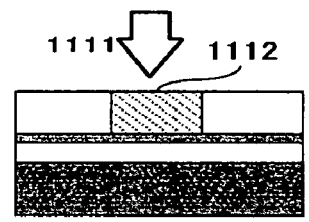
FIG. 19B is an explanatory view illustrating a step of determining step of determining a shape of the convex heat-insulating portions in an example of the method for producing an optical-recording medium according to the invention.

FIG. 19B illustrates a step of determining a shape of the convex heat-insulating portions. 1111 represents the direction of laser beam irradiation. Laser beam is applied from the thin film side. 1112 represents a demodified portion by the laser beam. Densities of the materials, crystalline state, composition and the like may change according to the heat generated in the optical-absorption layer. In order to form heat-insulating portions disposed continuously along the tracks, pulse laser is not applied, and continuous wave light (CW light) is continuously applied. In order to form a continuous structure, a laser light source is adjusted to make constant the relative velocity of the medium and light source, the medium is adjusted while the laser light source is fixed, or both the laser light source and the medium are adjusted. Examples of the laser light source include $F_2$ laser having a wavelength of about 157 nm, ArF laser having a wavelength of about 193 nm, and KrF laser having a wavelength of about 248 nm. Laser beam may be applied in the air. Also, laser beam may be applied to the medium as follows: the medium is placed in a closed container, several gases such as nitrogen, oxygen, steam, argon, hydrogen are introduced therein, and then laser beam is applied to the medium in the atmospheric gas. Laser light may be also applied to the medium in vacuo by placing the medium in a closed container. Laser light may be applied from the substrate side, and in that case, the substrate is required to be transparent.

Figure 19C:
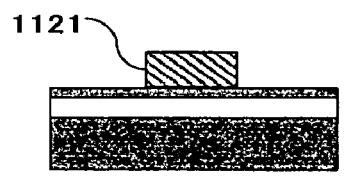
FIG. 19C is an explanatory view illustrating a step of removing the unnecessary parts of the thin film for forming convex heat-insulating portions in an example of the method for producing an optical-recording medium according to the invention.

FIG. 19C illustrates the step of removing the unnecessary parts of the thin film for forming convex heat-insulating portions. 1121 represents a convex heat-insulating portion. Wet etching using a solution may be used for processing. As for etching solution, a solution containing hydrofluoric acid is used. The part which is irradiated with laser light is removed by immersing the optical-recording medium in the hydrofluoric acid solution. When such wet etching method is used, the etching rate ratio (selection ratio) becomes large between the necessary part of the film for convex heat-insulating portions and the unnecessary part depending on the difference of the densities of film materials, crystalline state, composition and the like. Further, since the materials of the underlying optical-absorption layer and convex heat-insulating portion are different, the selection ratio may become larger between the underlying optical-absorption layer and convex heat-insulating portion.

Dry etching method may be also used as an etching method. Examples of the dry etching method include Reactive Ion Etching (RIE), Inductively Coupled Plasma (ICP), and sputter etching. By placing a medium in a vacuum apparatus and leaving the medium in the atmospheric gas composed of etching gases for a certain time, the convex heat-insulating portions having an even surface may be obtained in a large scale device such as optical-recording media.

In this way, fine convex heat-insulating portions are formed in a large scale without using lithography techniques.

Figure 19D:
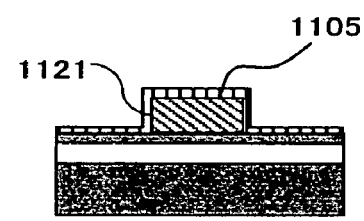
FIG. 19D is an explanatory view illustrating a step of forming a recording layer in an example of the method for producing an optical-recording medium according to the invention.

Next, as shown in FIG. 19D, a recording layer 1105 is provided. The recording layer may be formed by chemical vapor deposition method such as sputtering method evaporation method, or wet method such as plating method. Further, when an organic dye is used for the recording material, spin coating method and the like may be used.

According to the method for producing an optical-recording medium of the invention, the optical-recording medium in which the cross-write and cross-erase are sufficiently suppressed may be produced conveniently.

According to the invention, the optical-recording medium adapted to high-density recording, the recording and reproducing method, and the production method may be obtained, wherein the problems of the optical-recording medium such as cross-erase in which adjacent marks wrongly erased from adjacent tracks and cross-write in which signals wrongly recorded on adjacent tracks are solved.

EXAMPLE

The invention will be described in further detail with reference to several examples below, which are not intended to limit the scope of the invention.

Example 1

Figure 20:
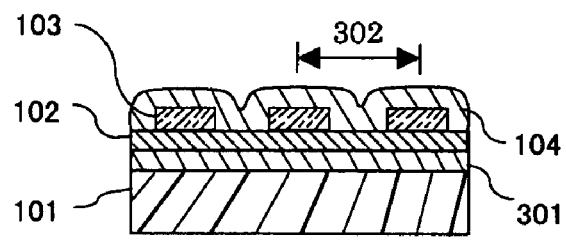
FIG. 20 is a cross-sectional view of an embodiment of the optical-recording medium having the heat-insulating portions.

The optical-recording medium shown in FIG. 20 was prepared, wherein polycarbonate was used for the substrate 101 and the thickness thereof was 0.6 mm, ZnS—$SiO_2$ (molar ratio of 8 to 2) was used for the buffer layer 301 and the thickness thereof was 50 nm, and ZnS—$SiO_2$ (molar ratio of 8 to 2) was used for the heat-insulating portions 103 and the thickness from the top surface of the optical-absorption layer to the top surface of the heat-insulating portion was 45 nm. The heat-insulating portions were continuously formed in a circular manner along the tracks, and the track pitch 302 was 370 nm. Bismuth oxide was used for the recording layer 104 and the thickness thereof was 15 nm. The buffer layer serves to prevent the damage to the substrate due to the heat during the recording, and simultaneously to control the degree of reflection.

The recording was conducted on the obtained optical-recording medium above. The wavelength of the laser light used for the recording was 780 nm, the numerical aperture of the object lens was 0.55, the recording power was 8 mW, and the pulse width was 50 nano seconds. Since the absorptivity of light is proportional to attenuation coefficient k of materials, comparing the absorptivity of light by the value of k, the attenuation coefficient k of Ge is about 0.5 and that of Bi oxide is about 0.1 for the light having a wavelength of 780 nm.

Figure 21:
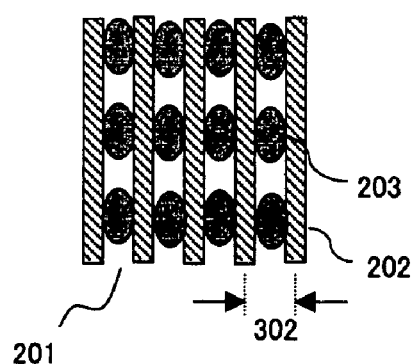
FIG. 21 is a schematic top view of the recording marks of an embodiment of the optical-recording medium.

The recording marks were observed using a scanning electron microscope, and it was found that the recording marks were formed on the part of the recording layer, under which the heat-insulating portions were not disposed and which part contacted with the optical-absorption layer. This is schematically shown in FIG. 21, and the figure is the top view of the optical-recording medium. In the figure, tracks 201, regions 202 where heat-insulating portions are arranged under the recording layer, record marks 203 are shown. Although the size of the light spot was about 1.2 μm and this was much larger than the track pitch 370 nm, cross-write and cross-erase did not occur even during the recording on the narrow track.

Example 2

The optical-recording medium shown in FIG. 20 was prepared, wherein polycarbonate was used for the substrate 101 and the thickness thereof was 0.6 mm, ZnS—SiO$_2$ (molar ratio of 8 to 2) was used for the buffer layer 301 and the thickness thereof was 50 nm, and Ag$_3$In$_{11}$Sb$_{27}$Te$_{59}$ was used for the optical-absorption layer 102 and the thickness thereof was 20 nm. ZnS—SiO$_2$ (molar ratio of 8 to 2) was used for the heat-insulating portions 103 and the thickness from the top surface of the optical-absorption layer to the top surface of the heat-insulating portion was 45 nm. The heat-insulating portions were continuously formed in a circular manner along the tracks, and the track pitch 302 was 200 nm. Bismuth oxide was used for the recording layer 104 and the thickness thereof was 15 nm.

The recording was conducted on the obtained optical-recording medium. The wavelength of the laser light used for the recording was 405 nm, the numerical aperture of the object lens was 0.85, the recording power was 4 mW, and the pulse width was 50 nano seconds. Since the absorptivity of light is proportional to attenuation coefficient k of materials, comparing the absorptivity of light by the value of k, the attenuation coefficient k of Ag$_3$In$_{11}$Sb$_{27}$Te$_{59}$ is about 2.7 and that of Bi oxide is about 0.29 for the light having a wavelength of 405 nm.

The recording marks were observed using a scanning electron microscope, and it was found that, like in Example 1, the recording marks were formed on the part where the recording layer contacted with the optical-absorption. This is schematically shown in FIG. 21.

Although the size of the light spot was about 390 nm and that was much larger than the track pitch 200 nm, cross-write and cross-erase did not occur even during the recording on the narrow track.

Example 3

The optical-recording medium shown in FIG. 20 was prepared in the same way as in Example 1, except that cyanine dye represented by the following Formula (A) was used for the recording layer 104 and the thickness thereof was 60 nm.

The recording was conducted in the same way as in Example 1, except that the recording power was 6 mW and observed. It was found that, like in Example 1, the recording marks were formed on the part where the recording layer contacted with the optical-absorption. This is schematically shown in FIG. 21.

Although the size of the light spot was about 1.2 μm and this was much larger than the track pitch 370 nm, cross-write and cross-erase did not occur even during the recording on the narrow track.

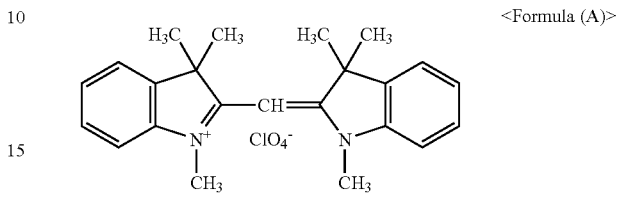

<Formula (A)>

Example 4

The recording was conducted on the optical-recording medium prepared in Example 3 by tracking between the heat-insulating portions which did not absorb the light having a wavelength of 780 nm with a pickup in which optical system having a wavelength of 780 nm and numerical aperture or NA of 0.55 is employed. The recording light was the pulse light modulated according to the given information.

Next, the reproducing was conducted by tracking the tracks using an optical system having a wavelength of 405 nm and numerical aperture or NA of 0.85. The reproducing was conducted very well.

Specifically, the use of the light having a wavelength at which absorption in the recording layer does not occur, as the recording light, enabled the recording on a narrow area. As long as the wavelength of the recording light is restricted, applicable range of the optical-recording medium is broad and high compatibility is allowed because the wavelength of the reproducing light is not limited except for the wavelength of the recording light.

Example 5

Figure 22:
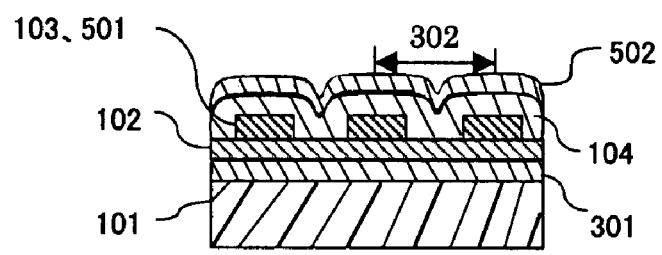
FIG. 22 is a cross-sectional view of an embodiment of the optical-recording medium having the super-resolution layer.

The optical-recording medium having a structure shown in FIG. 22 was prepared, wherein polycarbonate was used for the substrate 101 and the thickness thereof was 0.6 mm, ZnS—SiO$_2$ (molar ratio of 8 to 2) was used for the buffer layer 301 and the thickness thereof was 50 nm, and Ge was used for the optical-absorption layer 102 and the thickness thereof was 5 nm. ZnS—SiO$_2$ (molar ratio of 8 to 2) was used for the heat-insulating portions 103 and the thickness from the top surface of the optical-absorption layer was 45 nm. The heat-insulating portions were continuously formed in a circular manner along the tracks, and the track pitch 302 was 370 nm. Bismuth oxide was used for the recording layer 104 and the thickness thereof was 15 nm. SbTe was used for the super-resolution layer 502 and the thickness thereof was 20 nm.

The recording was conducted on the obtained optical-recording medium. The wavelength of the laser light used for the recording was 405 nm, the numerical aperture NA of the object lens was 0.85, the recording power was 6 mW, and the recording period of the recording marks was 200 nm.

This optical-recording medium was reproduced. The C/N was 0 at the usual reproducing-light intensity of 0.2 mW, indicating smaller than the resolution limit of the reproducing light. When the reproducing-light intensity was adjusted to 0.8 mW while rotating the medium at a rotating speed of 4.5 m/s, the C/N was 12 dB. Further, when the reproducing-light intensity was adjusted to 1.2 mW, the C/N rose up to 41 dB. Therefore, it was confirmed that reproduction was conducted by super-resolution phenomenon, and higher C/N was obtained.

Example 6

The optical-recording medium having a structure shown in FIG. 20 was prepared, wherein polycarbonate was used for the substrate 101 and the thickness thereof was 0.6 mm, ZnS—$SiO_2$ (molar ratio of 8 to 2) was used for the buffer layer 301 and the thickness thereof was 50 nm, and Ge was used for the optical-absorption layer 102 and the thickness thereof was 20 nm. This optical-absorption layer also serves as the super-resolution layer. ZnS—$SiO_2$ (molar ratio of 8 to 2) was used for the heat-insulating portions 103 and the thickness from the top surface of the optical-absorption layer was 45 nm. The heat-insulating portions were continuously formed in a circular manner along the tracks, and the track pitch 302 was 370 nm. Bismuth oxide was used for the recording layer 104 and the thickness thereof was 15 nm.

The recording was conducted on the obtained optical-recording medium. The wavelength of the laser light used for the recording was 405 nm, the numerical aperture of the object lens was 0.85, the recording power was 6 mW, and the recording period of the recording marks was 200 nm.

This optical-recording medium was reproduced. The C/N was 0 at the usual reproducing-light intensity of 0.2 mW, indicating smaller than the resolution limit of the reproducing light. When the reproducing-light intensity was adjusted to 1.2 mW while rotating the medium at a rotating speed of 7.0 m/s, the C/N was 10 dB. Further, when the reproducing-light intensity was adjusted to 2.0 mW, the C/N rose up to 28 dB. Therefore, it was confirmed that reproduction was conducted by super-resolution phenomenon, and higher C/N was obtained.

Example 7

Figure 23:
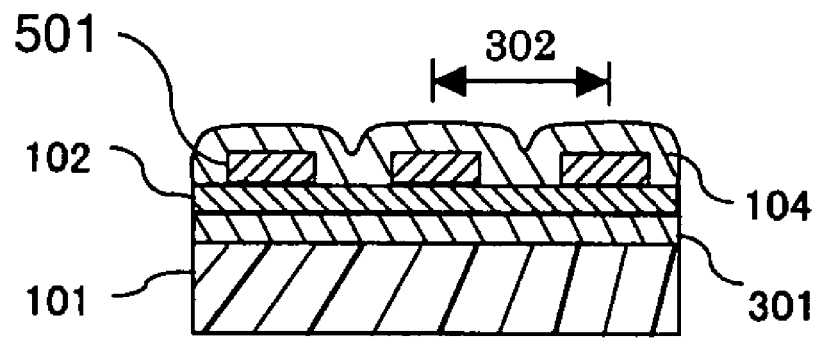
FIG. 23 is a cross-sectional view of an embodiment of the optical-recording medium having the light-intercepting portions.

The optical-recording medium having a structure shown in FIG. 23 was prepared in the same way as in Example 1, except that the heat-insulating portions 103 were replaced with the light-shielding portions 501 composed of Ag.

The recording was conducted on the obtained optical-recording medium in the same way as in Example 1. The recording marks as shown in FIG. 21 were formed. Like in Example 1, although the size of the light spot was about 1.2 μm and this was much larger than the track pitch 370 nm, cross-write and cross-erase did not occur even during the recording on the narrow track.

Example 8

The optical-recording medium according to the invention was prepared according to a method shown in FIGS. 19A to 19D.

First, in the step of disposing each of the layers shown in FIG. 19A, on a polycarbonate substrate 1101 with a thickness of 0.6 mm were sequentially formed a film of ZnS—$SiO_2$ (molar ratio of 8 to 2) as the buffer layer 1102 with a thickness of 50 mm, a film of Ge as the optical-absorption layer 1103 with a thickness of 5 nm, and a film of ZnS—$SiO_2$ as a layer 1104 for forming the heat-insulating portions with a thickness of 45 nm by sputtering method. The films were formed at a room temperature in an atmosphere of Ar.

Next, in the step of determining a shape of the heat-insulating portions shown in FIG. 19B, the part 1112 to be left as the heat-insulating portion was irradiated with laser light from the thin film side (in the direction of the arrow 1111 in the figure). CW light was used, wherein the wavelength was 405 nm, the numerical aperture of the object lens was 0.85, and recording power was 1.8 mW. Tracking and focus servo was applied, and the light was continuously applied while rotating the substrate at a rotating speed of 3.5 m/s. The pitch of the heat-insulating portions was 370 nm and width was 150 nm.

Next, in the etching shown in FIG. 19C, the unnecessary part except 1112 was removed and processed in a convex manner. The remaining part 1121 is the heat-insulating portion. Removal of the unnecessary part was performed by solution etching. As for etching solution, mixed solution of hydrofluoric acid (HF) and water ($H_2O$) was used. The 50% diluted hydrofluoric acid was used, and the solution ratio of HF to $H_2O$ was 1 to 10. The recording medium was soaked in the solution for 10 seconds. Soon after the etching, the recorded medium was washed with water, and the medium was dried with dried nitrogen and the like.

Finally, two kinds of film as the recording layer 1105 were formed in the step of FIG. 19D. One film made of bismuth oxide was formed to a thickness of 15 nm by sputtering, another film made of the organic dye represented by the Formula (A) was formed to a thickness of 60 nm by spin-coat method.

In this way, the optical-recording media having the heat-insulating portions was prepared.

The invention claimed is:

1. An optical-recording medium, comprising:
a substrate;
an optical-absorption layer which absorbs light and generates heat on or above the substrate;
a recording layer; and
record-blocking portions which block recording on the recording layer,
wherein the record-blocking portions are disposed between the recording layer and the optical-absorption layer, and between adjacent tracks, and
recording marks are formed on the recording layer by the optical absorption function of the optical-absorption layer.

2. The optical-recording medium according to claim 1, wherein the record-blocking portions are heat-insulating portions which insulate heat.

3. The optical-recording medium according to claim 2, wherein the heat-insulating portions comprise a mixture of a material A and a material B, and the material A is a silicon compound and the material B is at least one selected from the group consisting of sulfide, selenide, and fluoride.

4. The optical-recording medium according to claim 2, wherein the thermal conductivity of the heat-insulating portions is lower than that of a material of the recording layer.

5. The optical-recording medium according to claim 2, wherein the optical absorptivity of the heat-insulating portions at a wavelength of recording light is $1 \times 10^{-3}$ to $1 \times 10^{-5}$.

6. The optical-recording medium according to claim 1, wherein the record-blocking portions are light-intercepting portions which intercept light.

7. The optical-recording medium according to claim 6, wherein the light-intercepting portions comprise one of at least one metallic material and a mixture of a material A and a material B, and wherein the material A is a silicon compound and the material B is at least one selected from the group consisting of sulfide, selenide, and fluoride.

8. The optical-recording medium according to claim 1, wherein the record-blocking portions are spaced at specific intervals on a light source side with respect to the optical-absorption layer.

9. The optical-recording medium according to claim 1, wherein the record-blocking portions are formed in either a circular or spiral manner.

10. The optical-recording medium according to claim 1, wherein the recording layer comprises any one of a metal, a semiconductor, and a semimetal oxide.

11. The optical-recording medium according to claim 1, wherein the recording layer comprises an organic dye.

12. The optical-recording medium according to claim 11, wherein the organic dye has a maximum absorption band which does not include a wavelength of recording light.

13. The optical-recording medium according to claim 1, wherein the optical-absorption layer is free from one of change in its properties and deformation when the optical-absorption layer absorbs light and the temperature rises.

14. The optical-recording medium according to claim 1, further comprising a super-resolution layer,
wherein the super-resolution layer causes super-resolution phenomenon by one of the intensity distribution of applied light and the thermal distribution resulting from light irradiation.

15. The optical-recording medium according to claim 14, wherein the super-resolution layer also serves as the optical-absorption layer.

16. A method for recording and reproducing an optical recording medium comprising:
irradiating the optical-recording medium with recording light and reproducing light to record and reproduce information,
wherein the recording light has a wavelength different from that of the reproducing light,
wherein the optical-recording medium comprises:
a substrate;
an optical-absorption layer configured to absorb light and generate heat on or above the substrate;
a recording layer; and
record-blocking portions configured to block recording on the recording layer, and
wherein the record-blocking portions are disposed between the recording layer and the optical-absorption layer, and between adjacent tracks, and
recording marks are formed on the recording layer by the optical absorption function of the optical-absorption layer.

17. The method for recording and reproducing an optical recording medium according to claim 16, wherein the recording light and the reproducing light are applied through a substrate.

* * * * *

UNITED STATES PATENT AND TRADEMARK OFFICE
CERTIFICATE OF CORRECTION

PATENT NO.         : 7,636,289 B2
APPLICATION NO.    : 11/660884
DATED              : December 22, 2009
INVENTOR(S)        : Yoshitaka Hayashi, Hiroshi Miura and Hisamitsu Kamezaki It is certified that error appears in the above-identified patent and that said Letters Patent is hereby corrected as shown below:

Replace the title of the patent with the following:

--(54)   OPTICAL-RECORDING MEDIUM, METHOD FOR PRODUCING
         THE SAME, AND METHOD FOR RECORDING AND
         REPRODUCING OPTICAL-RECORDING MEDIUM--

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,636,289 B2 Page 1 of 1
APPLICATION NO. : 11/660884
DATED : December 22, 2009
INVENTOR(S) : Yoshitaka Hayashi, Hiroshi Miura and Hisamitsu Kamezaki It is certified that error appears in the above-identified patent and that said Letters Patent is hereby corrected as shown below:

Title Page, Item (54) and at Column 1, lines 1-4,
Replace the title of the patent with the following:

--OPTICAL-RECORDING MEDIUM, METHOD FOR PRODUCING
THE SAME, AND METHOD FOR RECORDING AND
REPRODUCING OPTICAL-RECORDING MEDIUM--

This certificate supersedes the Certificate of Correction issued July 13, 2010.

Signed and Sealed this

Seventeenth Day of August, 2010

David J. Kappos
*Director of the United States Patent and Trademark Office*